United States Patent [19]
Krause et al.

[11] Patent Number: 6,070,198
[45] Date of Patent: May 30, 2000

[54] ENCRYPTION WITH A STREAMS-BASED PROTOCOL STACK

[75] Inventors: Michael R. Krause, Boulder Creek; Yoshihiro Ishijima, San Jose, both of Calif.

[73] Assignee: Hewlett-Packard Company, Palo Alto, Calif.

[21] Appl. No.: 08/732,176

[22] Filed: Oct. 16, 1996

Related U.S. Application Data

[63] Continuation-in-part of application No. 08/593,313, Jan. 31, 1996, which is a continuation-in-part of application No. 08/545,561, Oct. 19, 1995, Pat. No. 5,815,707.

[51] Int. Cl.$^7$ ........................................................ G06F 9/46
[52] U.S. Cl. ............................................................. 709/321
[58] Field of Search ............................. 395/681; 709/301

[56] References Cited

U.S. PATENT DOCUMENTS

| | | | |
|---|---|---|---|
| 5,454,039 | 9/1995 | Coppersmith | 380/28 |
| 5,675,652 | 10/1997 | Coppersmith | 380/28 |
| 5,737,543 | 4/1998 | Gavin et al. | 395/285 |
| 5,815,707 | 9/1998 | Krause et al. | 709/301 |

OTHER PUBLICATIONS

Rago, Stephen A., "UNIX System V Network Programming", Addison–Wesley, pp. 95–97, 425–478, 1993.

(no author), "Digital UNIX", Digital Equipment Corporation, pp 3–20, Mar. 1996.

(no author given), "DEC OSF/1 Network Programmer's Guide", Digital Equipment Corporation, Maynard, Massachusetts, Chapter 5, pp. 5–1 to 5–31, A1–A3, Aug. 1994.

Stephen A. Rago, UNIX System V Network Programming, Addison–Wesley Pub. Co., Chapter 3, pp. 95–148.

Stephen A. Rago, UNIX System V Network Programming, Addison–Wesley Pub. Co., Chapters 9–11, pp. 425–576.

*Primary Examiner*—Alvin E. Oberley
*Assistant Examiner*—St. John Courtenay, III
*Attorney, Agent, or Firm*—David A. Plettner

[57] ABSTRACT

A STREAMS-based protocol stack is adapted to encrypt and decrypt data flowing through the stack. In a first embodiment, a STREAMS-based module is added to a protocol stack to encrypt and decrypt data flowing through the stack. In a second embodiment, a STREAMS-based encryption multiplexor routes data to and from an encryptor. In a third embodiment, dynamic function registration is used to register cryptographic functions at a stream head. In a fourth embodiment, STREAM-based modules are modified, either by dynamic function replacement or conventional means known in the art, to redirect data flowing between protocol stack layers to an encryptor. Hardware-based and software-based encryptor configurations are disclosed for all embodiments, as well as various methods of identifying cryptographic characteristics, such as cryptographic algorithms, public and private encryption keys, bindings to applications and IP addresses, and the like.

32 Claims, 6 Drawing Sheets

ENCRYPTION WITH A STREAMS-BASED PROTOCOL STACK

CROSS REFERENCE TO RELATED APPLICATION

This is a continuation-in-part application of U.S. patent application Ser. No. 08/593,313 filed Jan. 31, 1996 pending and entitled "STREAMS Function Registering", which in turn is a continuation-in-part application of U.S. patent application Ser. No. 08/545,561, filed Oct. 19, 1995, now U.S. Pat. No. 5,815,707, and entitled "Dynamic Function Replacement For STREAMS Framework".

FIELD OF THE INVENTION

This invention relates to data communications within and between computer systems. More particularly, this invention relates to providing data communications within and between computer systems using a modified protocol stack that encrypts and decrypts data as the data flows through the protocol stack.

DESCRIPTION OF RELATED ART

Cryptography is becoming increasingly important in the field of computing. The volume of information transmitted over unsecured networks, such as the Internet, continues to increase. In addition, unsecured networks are now being used to facilitate financial transactions, as well as transmit a variety of other types of confidential and private data.

Cryptography helps to ensure that data transmitted over unsecured networks is not intercepted by anyone except the intended recipient. In the prior art, the cryptographic function was usually controlled by the application generating the data to be encrypted. The application either included the cryptographic algorithm or used an algorithm stored in a function library provided by the computer's operating system. This approach has several limitations. First, if the cryptographic algorithm is included in the application, it cannot be easily updated. Second, using a cryptographic algorithm stored in a function library (typically a secured socket library) is inefficient because data must be copied several times and processed in both user space and kernel space. Finally, if the application does not support cryptography, it is much more difficult to encrypt the application's data. What is needed in the art of computer networking is a shift in the cryptographic paradigm from application-based encryption to connection-based (or alternatively, I/O-based) encryption.

SUMMARY OF THE INVENTION

The present invention provides a method and apparatus for performing a cryptographic function upon data passing through a protocol stack. In a first embodiment of the present invention, data is encrypted and decrypted by a module or driver that includes a software-based cryptographic algorithm in one configuration, and a driver coupled to a hardware-based encryptor in another configuration.

In a second embodiment of the present invention, a protocol stack multiplexor routes data to an encryption module or driver. This embodiment also supports hardware-based and software-based configurations, and is especially beneficial when several hardware-based encryptors are available and the multiplexor is configured to implement a scheduling algorithm that selects an available encryptor.

In a third embodiment of the present invention, dynamic function registration is used to register a cryptographic function at the stream head. The cryptographic function can implement software-based cryptography, or can act as a driver that interfaces to a hardware-based encryptor. In one configuration of this embodiment, the data is encrypted as it is copied from user space to kernel space and decrypted as it is copied from kernel space to user space.

In a fourth embodiment of the invention, data is encrypted and decrypted by a driver or module that includes dynamically replaceable functions that control the cryptographic process. This embodiment also supports hardware-based and software-based configurations.

DETAILED DESCRIPTION OF THE PREFERRED EMBODIMENTS

Figure 1:
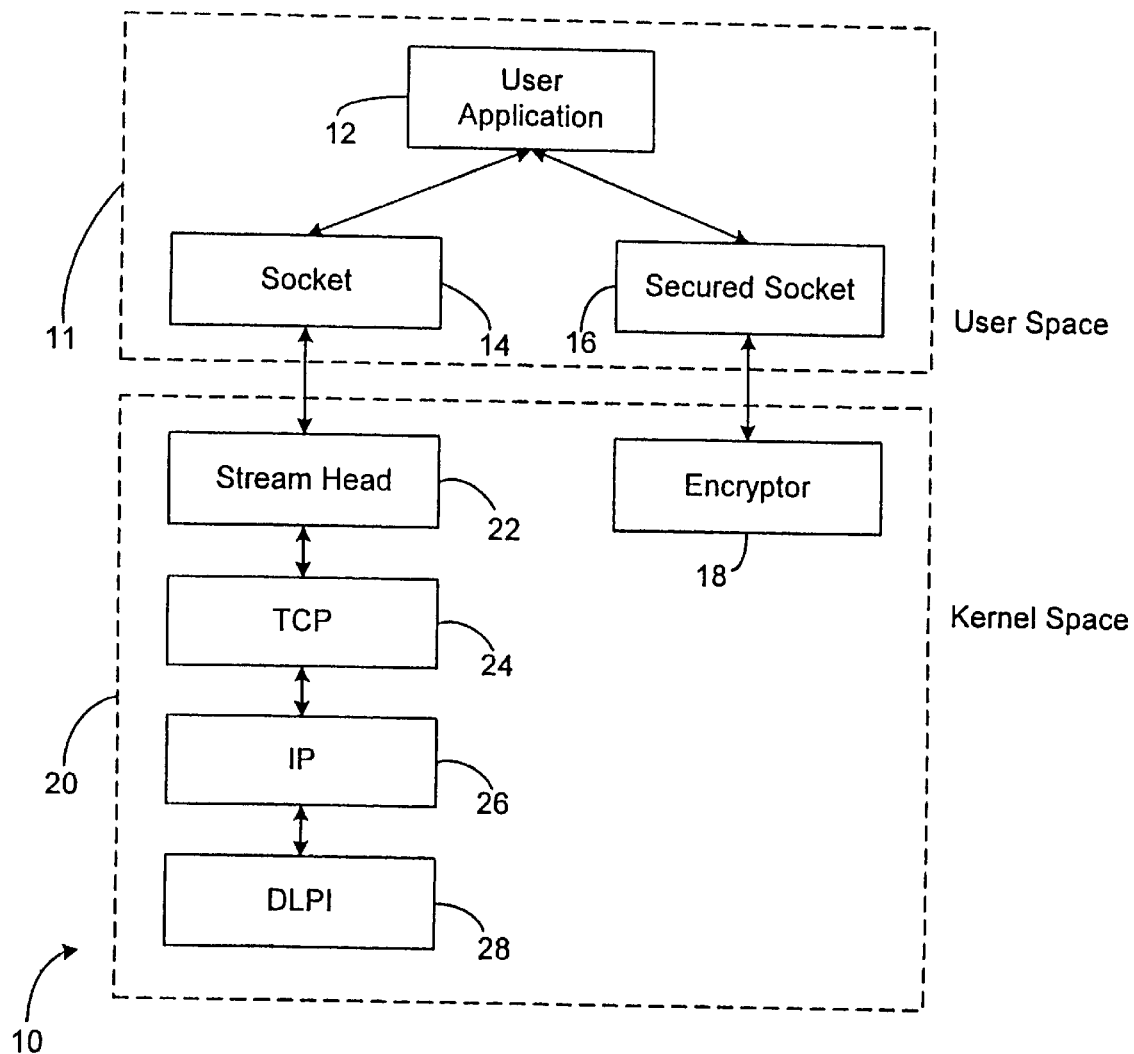
FIG. 1 is a diagram of a prior art computer system having a prior art protocol stack and prior art secured socket layer cryptographic package.

FIG. 1 is a diagram of a prior art computer system 10. Computer system 10 includes user space 11 and kernel space 20. User space 11 includes user application 12, socket 14, and secured socket 16. Kernel space 20 includes encryptor 18, stream head 22, transmission control protocol (TCP) layer 24, Internet protocol (IP) layer 26, and data link provider interface (DLPI) layer 28. Encryptor 18 may be implemented using a hardware or software based cryptographic algorithm. Stream head 22, TCP layer 24, IP layer 26, and DLPI layer 28 implement a STREAMS-based protocol stack. Helpful discussions and examples of the STREAMS framework are found in chapter 3 beginning on pg. 95, and chapters 9 through 11 beginning on page 425, of UNIX System V Network Programming by S. Rago, Addison Wesley professional computing series, (1993), which is incorporated herein by reference.

As used herein, the terms "cryptography" and "cryptographic" encompasses "encryption" and "decryption." It is also common in the art to use the term "encryption" in a broad context that includes decryption. Accordingly, the term "encryption keys" also encompasses the keys necessary to decrypt data. Likewise, a hardware-based encryptor is also capable of decrypting data. Of course, in other contexts, the term "encryption" does not encompass the term "decryption," and such contexts are readily apparent to those skilled in the art.

As shown in FIG. 1, user application 12 is configured to send and receive encrypted data over a network. To send encrypted data, application 12 must first encrypt the data by sending unencrypted data to encryptor 18 via secured socket 16. Typically, this is accomplished by user application 12 invoking a system call, such as a send( ) command. The secured socket library associated with secured socket 16 maps the send( ) command to an implementation-specific write command that provides encryptor 18 with the data to be encrypted. After the data has been encrypted, user application 12 invokes a system call to retrieve the encrypted data, such as a recv( ) command. The recv( ) command is mapped to an implementation-specific read command that retrieves the encrypted data from encryptor 18, and the encrypted data is then provided to user application 12. Thereafter, user application 12 transmits the encrypted data over the network by sending the encrypted data to stream head 22 via socket 14 by invoking another system call (such as another send( ) command). From stream head 22, the encrypted data flows through TCP layer 24, IP layer 26, and DLPI layer 28. DLPI layer 28 initiates a direct memory access (DMA) operation between memory and the physical network hardware, which transmits the encrypted data over the physical network.

Each time a send( ), recv( ), or implementation-specific read or write command is invoked, data must be moved between user space 11 and kernel space 20. These data movements are accomplished by the command invoking either a Unix copyin( ) or copyout( ) function. The copyin( ) function moves data from user space to kernel space and the copyout( ) function moves data from kernel space to user space.

To read encrypted data, the process is reversed. DLPI layer 28 initiates a DMA operation between the physical network hardware and memory, and the encrypted data flows through IP layer 26, TCP layer 24, and stream head 22. User application 12 receives the encrypted data from stream head 22 via socket 14 by invoking a system call, such as a recv( ) command. Then user application 12 must decrypt the encrypted data by transmitting the encrypted data to encryptor 18 via secured socket 16 by invoking another system call, such as a send( ) command, and receiving the unencrypted data from encryptor 18 via secured socket 16 by invoking a final system call, such as another recv( ) command.

While the cryptographic process illustrated in FIG. 1 is functional, there are several drawbacks. Foremost, performance is not optimal. Data must be moved into and out of secured socket 16 and encryptor 18, and into and out of socket 14, stream head 22, and layers 24, 26, and 28. Moving the data in this manner will typically involve copying the data repeatedly between user space and kernel space. In addition, system resources must be dedicated to maintain multiple sockets, buffers, and other resources for each application instance, and CPU utilization increases as all these tasks are managed.

Another drawback is that the encryption process is controlled from user space 11. Data and activities in user space are more vulnerable to malicious attacks than those in kernel space, and therefore an encryption process controlled from user space is more susceptible to such an attack than is as an encryption process that is controlled from within kernel space.

This vulnerability has been demonstrated by Eric Brewer, Paul Gauthier, Ian Goldberg, and David Wagner (all of the University of California—Berkely). Brewer et al. assert that the focus on secure session-layer protocols and sufficient randomness of encryption keys have obscured more fundamental flaws in end-to-end security. Specifically, not only must the protocol be secure, but the user code must also be secure at each end point. To prove their point, Brewer et al. demonstrated how the binary code of a program could be patched on the fly as it is transmitted over a network. They used this method to turn a legitimate copy of NetScape's Navigator browser into a version that used a fixed key that only they knew, thereby invisibly eliminating security. Therefore, even if a user can trust the vendor of a particular application, the code itself cannot be trusted if it was transmitted over an unsecured network.

Finally, another drawback associated with the cryptographic process shown in FIG. 1 is that user application 12 must initiate encryption. If application 12 is a legacy application that was not designed to support cryptography, then the data that application 12 send over a network cannot be encrypted. Even if user application 12 was designed to support cryptography, it may not be flexible enough to support new cryptographic algorithms, which may use larger encryption keys or use different formats.

The present inventions solves the problems associated with the cryptographic process illustrated in FIG. 1 by moving the cryptographic function into the protocol stack. By including cryptography in the protocol stack, the copying and moving of data is minimized. In addition, since encryption and decryption are performed in kernel space, the cryptographic process is not as vulnerable to malicious attack or "snooping."

By using the present invention, data can be encrypted using keys provided by the kernel, in contrast to the application. This reduces the role of the user application in providing encrypted data transmission, thereby increasing security. In addition, the user application does not have to support encryption. The present invention can be configured to encrypt and decrypt any information flowing through a protocol stack.

The present invention supports cryptography using either hardware-based or software-based cryptographic algorithms. At the current state of cryptographic technology, hardware-based cryptographic algorithms are preferred over software-based cryptographic algorithms for several reasons. First, embedded hardware is fast. Current commercially available encryption hardware is capable of encrypting data at a rate greater than 1 megabyte per second. Second, since the cryptographic function is off-loaded to dedicated hardware, the CPU is available to perform other processing in parallel. Third, since many hardware-based encryption devices emulate standard SCSI devices, hardware may be used in non-secured operating system environments and in a large number of platforms. Fourth, physical hardware is harder to alter and sabotage. Physical devices can be equipped with mercury destruction devices. Finally, updating cryptographic technology can be relatively easy. For example, cryptographic technology and/or encryption keys can be provided on a PCMCIA card, and the card can simply be swapped when updating cryptographic technology.

Of course, there are disadvantages to hardware encryption, and many of these disadvantages tend to be addressed by software encryption. First, the number of encryption protocols is growing, and current hardware encryption implementations only support up to four encryption protocols. Software can support any number of protocols, and they can be installed or updated on-the-fly. Second, host CPU power is growing faster than embedded processor power, and parallel processing and scaling techniques continue to improve. Eventually, software-based cryptographic techniques may outperform hardware-based cryptographic techniques. Third, hardware requires that data be moved through an I/O channel or be accessed by DMA operations, while software can encrypt data within the same memory location without requiring DMA operations or hardware interrupt processing. In addition, memory bandwidth is typically many times greater than I/O bandwidth. Fourth, software does not require multiple context switches, and therefore does not pollute the CPU cache. Finally, software can be quickly patched should any security problems be discovered.

The present invention provides maximum flexibility by supporting both hardware and software encryption. For example, assume that a STREAMS-based protocol stack in accordance with the present invention is configured to perform hardware-based encryption and decryption of all data flowing through the stack, and a security problem is discovered. A software-based encryption algorithm can be substituted for the hardware-based algorithm, with no effect on the application or the user. After the security problem is resolved and hardware is available, hardware encryption can easily replace the temporary software encryption routine.

It is also within the scope of this invention to encrypt inbound data and decrypt outbound data, and those skilled in the art will easily recognize how to adapt the techniques described herein to achieve such a result. However, it is expected that encrypting data in this manner will be limited to very few applications, and it will be much more typical to encrypt outbound data and decrypt inbound data. Accordingly, the descriptions of the embodiments of the present invention will be made with reference to a STREAMS-based TCP/IP stack that encrypts outbound data and decrypts inbound data. Note that the techniques described herein are applicable to any type of protocol stack.

Figure 2:
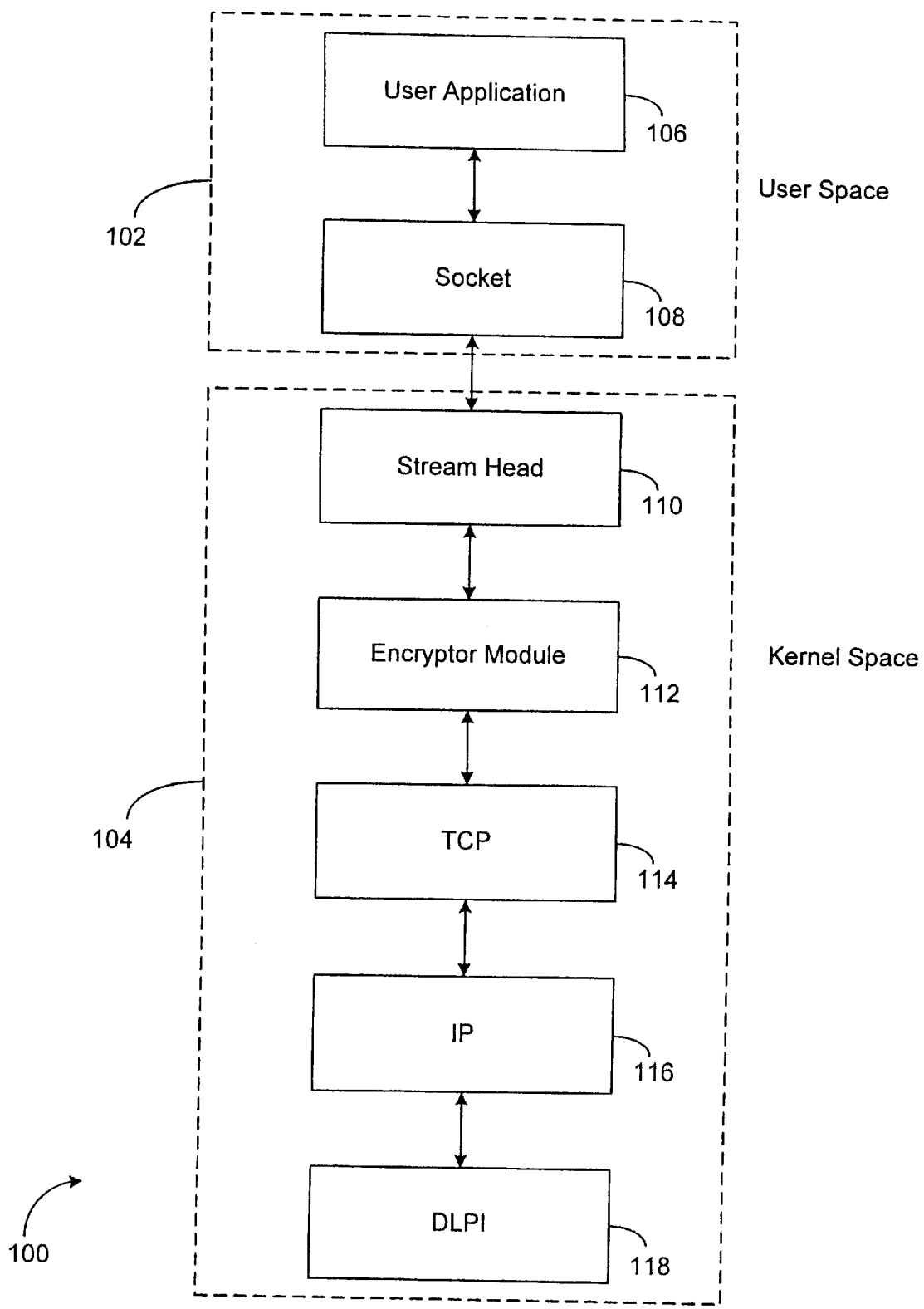
FIG. 2 is a diagram of a computer system showing an embodiment of the present invention that uses STREAMS-based modules and drivers to control encryption and decryption of data.

FIG. 2 is a diagram of a computer system 100 showing an embodiment of the present invention. Computer system 100 includes user space 102 and kernel space 104. User space 102 includes user application 106 and socket 108. Kernel space 104 includes stream head 110, encryptor module 112, TCP layer 114, IP layer 116, and DLPI layer 118.

In FIG. 2, when user application 106 desires to write data via a TCP/IP connection, application 106 transmits the data to socket 108 by invoking a system call, such as a send( ) command. The system call invokes a copyin( ) function that transfers data from user space 102 into kernel space 104. Encryptor module 112 encrypts the data, TCP layer 114 and IP layer 116 perform processing in accordance with the TCP/IP protocol, and DLPI layer 118 initiates a DMA operation that provides the data to the physical network hardware.

The embodiment shown in FIG. 2 uses standard STREAMS-based modules to add cryptographic technology to a STREAMS-based protocol stack. In FIG. 2, encryptor module 112 may be placed in a variety of other locations, such as between TCP layer 114 and IP layer 116, or between IP layer 116 and DLPI layer 118.

Encryptor module 112 encrypts data using software-based algorithms, or hardware-based algorithms, as are known in the art. In addition, user application 106 can selectively add and remove encryption by pushing encryptor module 112 on the stack and pulling encryptor module 112 from the stack. This works especially well when encryptor module 112 is the first module under stream head 110, as is shown in FIG. 2.

In addition, computer 100 can be configured to add encryption to any TCP/IP stack using the STREAMS autopush facility. The autopush facility allows modules to be automatically pushed on the stack by the operating system whenever predefined types of stacks are opened. For example, with the autopush facility properly configured, whenever a user application opens a TCP/IP stack, an encryption module is also pushed onto the stack after TCP layer 114.

Encryptor module 112 can also be positioned directly above DLPI layer 118, and configured to encrypt all data passing through a single DLPI layer instance. However, such a configuration would require some sort of mechanism to differentiate between stacks that encrypt at the DLPI layer and those that do not. One mechanism uses different device file names for a single hardware device instance, with a protocol stack associated with one file name supporting encryption and another protocol stack associated with another file name not supporting encryption. This mechanism works well with the autopush facility, because the operating system can be configured to automatically push encryptor module 112 onto DLPI layer 118 and link encryptor module 112 to IP layer 116 whenever a stream referencing the file name associated with encryption is opened. In addition, autopush can be configured to not push encryptor module 112 onto DLPI layer 118 when a stream referencing the file name associated with a stack that does not encrypt is opened.

Another mechanism that can be used to differentiate between stacks that encrypt and decrypt at the DLPI layer and those that do not is to specify whether encryption is desired when configuring a network connection using an ifconfig function call. In the Unix operating system, an ifconfig function call is used to assign an address to a network interface and/or configure network interface parameters. The ifconfig function call must be used at boot time to define the network address of each interface present on computer system, and can also be used at other times to redefine a particular address or other operating parameters. Accordingly, the present invention includes a modified ifconfig function call that is capable of defining encryption parameters along with the other network interface parameters.

Figure 3:
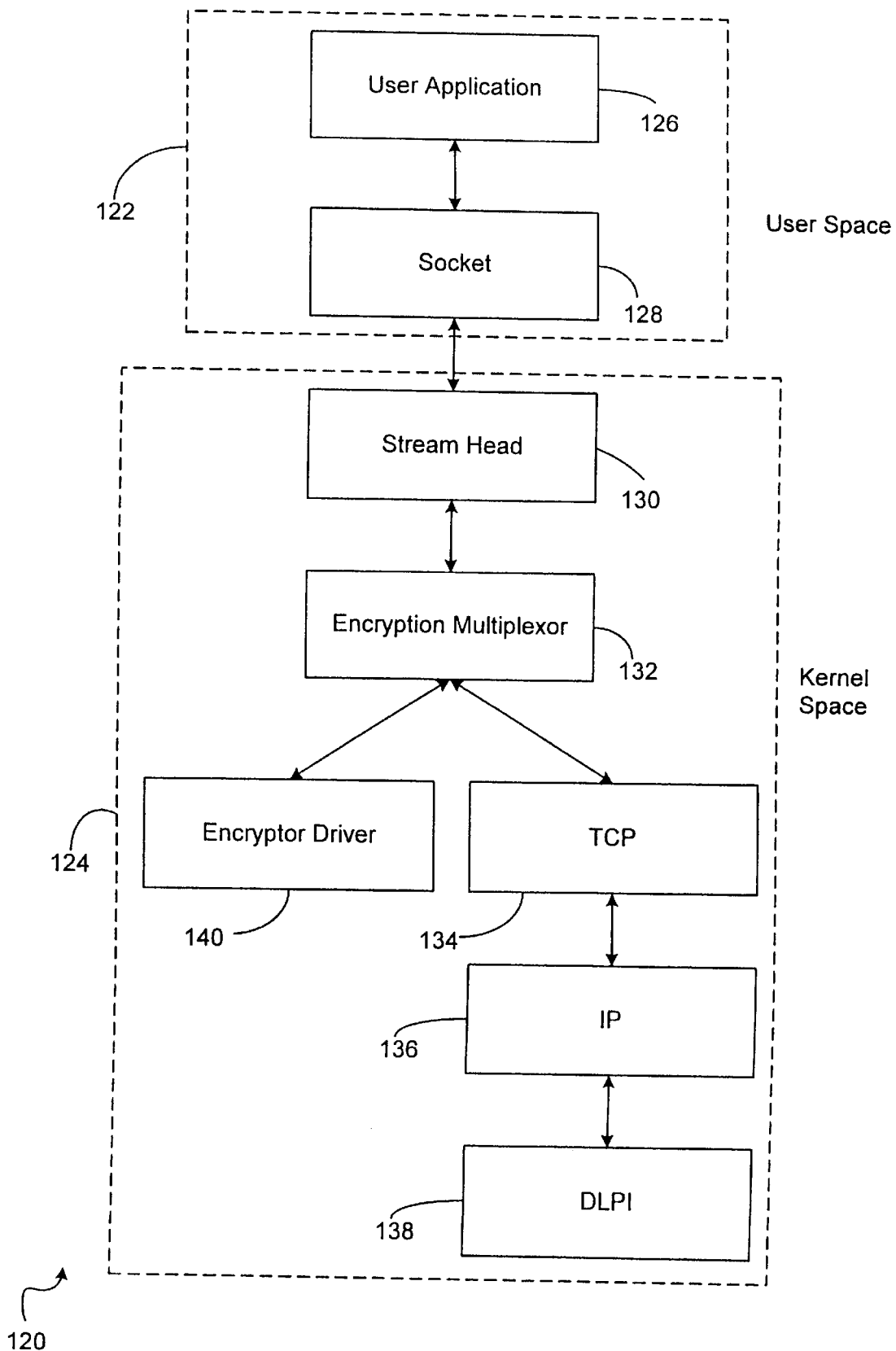
FIG. 3 is a diagram of a computer system showing an embodiment of the present invention that uses a STREAMS-based encryption multiplexor to route data to an encryption module or an encryption driver.

FIG. 3 is a diagram of a computer system 120 showing another embodiment of the present invention. Computer system 120 includes user space 122 and kernel space 124. User space 122 includes user application 126 and socket 128. Kernel space 124 includes stream head 130, encryption multiplexor 132, TCP layer 134, IP layer 136, DLPI layer 138, and encryptor driver 140. User application 126, socket 128, stream head 130, TCP layer 134, IP layer 136, and DLPI layer 138 operate in a manner similar to correspondingly named components in FIG. 2. However, instead of placing an encryption module in-line with the other stack modules, encryption multiplexor 132 routes data to and from encryptor driver 140.

STREAMS-based multiplexor modules are standard STREAMS components that are used to route data. For example, multiplexor modules are used by networking protocols to multiplex messages between multiple users and possibly multiple transmission media. Likewise, encryption multiplexor 132 can allow a single hardware-based encryptor to be shared by multiple STREAMS stack instances at the same time. Alternatively, encryption multiplexor 132 can be configured to select an available hardware-based encryptor from a plurality of hardware-based encryptor by using a simple scheduling algorithm.

In the prior art, the Secured Socket Library (SSL) specification v. 3.0 defined a protocol that allows a cryptographic package to pass messages between the package and the user application to configure how encryption and decryption will proceed, including the encryption keys that will be used, the connections that will be encrypted, and the like. To provide maximum compatibility and minimize programming costs, this protocol may be employed in the present invention, with the encryption multiplexor 132 of FIG. 3 storing encryption keys and directing encryption and decryption. In the embodiment shown in FIG. 2, encryptor module 112 stores the encryption keys and directs encryption and decryption.

While both embodiments shown in FIGS. 2 and 3 may be configured to work with either software-based or hardware-based encryption, the embodiment shown in FIG. 2 is better suited for use with software-based encryption, while the embodiment shown in FIG. 3 is better suited for use with hardware-based encryption. The discussion below describes one method for adapting encryption multiplexor 132 and encryptor driver 140 to operate with a hardware-based encryptor, but those skilled in the art will recognize that similar techniques may be used to adapt encryptor module 112 of FIG. 2 to operate with a hardware-based encryptor.

When a data message pointing to data to be encrypted arrives at the multiplexor, the multiplexor examines the message and looks up the appropriate encryption key. The encryption key may be bound to the application instance, such that all data originating from a specific application uses a specific key, or the encryption key may be bound to the IP address, such that all data being sent to a specific IP address is encrypted using a specific key.

After obtaining an encryption key, the encryption multiplexor 132 acquires a spinlock which is used to atomically increment an "in-progress" counter indicating that the TCP/IP stack has an outstanding encryption in progress and the stream cannot be closed until the "in-progress" counter equals zero, which indicates that no outstanding encryption requests are pending. The "in-progress" counter is defined as part of the private data structure associated with each instance of encryption multiplexor 132. This counter is examined to prevent a close race condition that could result in a system panic.

The encryption multiplexor 132 then sets up a data structure that includes a callback function (usually a STREAMS putnext( ) function) that has as a target the write queue of the next module in the stack, which is TCP layer 134. The data structure also includes a pointer to the memory block that holds the data to be encrypted. The multiplexor then acquires a synchronization queue that serializes encryption requests. If encryption multiplexor 132 cannot acquire the synchronization queue because another encryption operation is in progress, then the multiplexor acquires the hardware's wait queue spinlock and places the transaction into the wait queue for future processing. Encryption multiplexor 132 then returns to service other messages flowing through the stack.

When the synchronization queue is acquired, the hardware-based encryption process will be launched using a software interrupt service, which will allow a hardware-based encryptor to execute without impacting the execution of user application 126 by executing in parallel with application 126.

After the hardware-based encryptor encrypts the data, it invokes an interrupt service routine (ISR). The ISR launches the callback function, which sends the encrypted data to the write queue of TCP layer 134, and clears the "in-progress" flag by acquiring the flag's spinlock. Since the encryption hardware performed the encryption directly upon the data stored in the memory block, the encryption was done "in place" without unnecessary memory management nor data movement.

For inbound data, the process is essentially the same, except that the callback function included in the data structure set up by encryption multiplexor 132 has as the target the read queue of stream head 130.

While FIGS. 2 and 3 illustrate how cryptography can be added to a STREAMS-based protocol stack using standard STREAMS modules and drivers, the teachings of two co-pending patent applications assigned to the same assignee as the present application can be adapted to provide a better mechanism for providing cryptography in a STREAMS-based protocol stack. These two applications are U.S. patent application Ser. No. 08/593,313 filed Jan. 31, 1996 and entitled "STREAMS Function Registering" and U.S. patent application Ser. No. 08/545,561, filed Oct. 19, 1995 and entitled "Dynamic Function Replacement For STREAMS Framework." Both of these applications are hereby incorporated by reference.

In a STREAMS-based protocol stack of the prior art, a stream is constructed by pushing modules onto a last-in first-out (LIFO) stack. When a module (such as TCP layer 24 in FIG. 1) is pushed onto the stack, the module is linked to the read and write queues of the module or driver previously pushed on the stack (such as IP layer 26), and the read and write queues of the module being pushed onto the stack are linked to the stream head (such as stream head 22). At the bottom of the stack is a driver (such as DLPI layer 28) that links data to physical hardware or performs sort of processing function. The stream head is at the top of the stack and copies data between user space and kernel space. The stream head also and serves as the entry point to the stream from the point of view of the user application. The modules between driver and the stream head perform various processing functions.

In the prior art, changing the functionality of a stream required that the stream be pulled apart and reconstructed. If it was desired to change the functionality of a module adjacent the driver, every module above the driver had to be pulled off the stack, an updated version of the module (containing the new functionality) had to be pushed on the stack, and all the modules that previously existed above the module that was changed had to be pushed pack on to the stack. This process is slow and processor intensive, and the stack is not available while it is being reconfigured.

Dynamic function replacement allows a module to have alternate execution paths. By issuing a command, different functions can be switched into and out of a STREAMS-based protocol stack on the fly. Dynamic function replacement is an ideal mechanism for providing a TCP/IP stack with the ability to selectively encrypt and decrypt data flowing through the stack. In addition, a TCP/IP stack can be configured with multiple cryptography protocols, and these protocols can be dynamically changed as needed.

In contrast, dynamic function registration permits various functions to be registered at the stream head. The stream head is provided with a controller capable of directing execution of the registered functions. One advantageous application for dynamic function registration is 32-bit to 64-bit conversions. If a 32-bit application is writing data to a stream head in a 64-bit operating system, the stream head can be configured to recognize that the data needs to be converted to a 64-bit format, and direct execution of modules in the STREAMS-based stack to perform the conversion. By analogy, dynamic function registration can be used to register cryptographic functions, and control execution of those functions upon the data flowing through the protocol stack. Registration of functions is initiated by the user process or a STREAMS-based module or driver.

Dynamic function registration allows functionality to be added to or removed from the stream head. In contrast, dynamic function replacement allows functionality to be added to or removed from any module or driver in the stream by swapping different execution paths into and out of the stream.

Two additional embodiments of the present invention will be described below. One embodiment encrypts and decrypts data at stream head 22 in FIG. 1. Since the cryptographic function is added at the stream head, dynamic function registration is used to control encryption and decryption of data flowing through the stream.

The other embodiment encrypts and decrypts data at other points in the TCP/IP stack, such as between TCP layer 24 and IP layer 26 in FIG. 1. Since the encryption function is added to a module or driver, the module or driver can be adapted to provide the cryptographic function or dynamic function replacement be used to selectively insert the cryptographic function into the execution path of the module or driver.

Hardware-based and software-based configurations will be described for each embodiment. The embodiments discussed below can be easily adapted to apply to a connectionless UDP/IP stack, or other protocol stacks known in the art.

Figure 4:
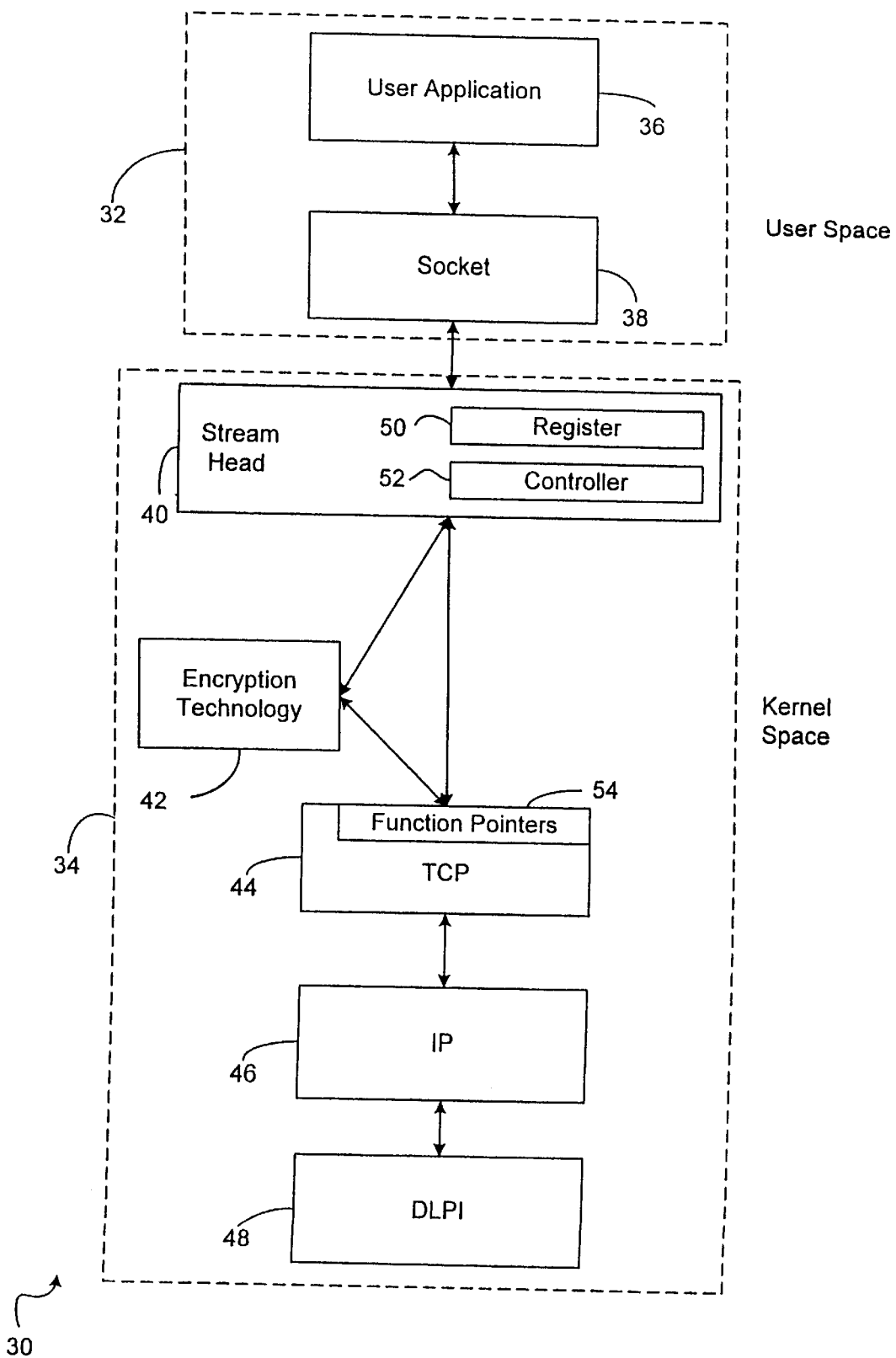
FIG. 4 is a diagram of a computer system wherein cryptographic technology is controlled by functions registered at a stream head.

FIG. 4 is a diagram of a computer system 30 adapted to encrypt and decrypt data flowing through a STREAMS-based protocol stack in accordance with the present invention. Computer system 30 includes user space 32 and kernel space 34. User space 32 includes user application 36, and socket 38. Kernel space 34 includes stream head 40, encryption technology 42, TCP layer 44, IP layer 46, and DLPI layer 48. Stream head 40 includes a register 50 and a controller 52, and TCP layer 44 includes function pointers 54.

Encryption technology 42 is not actually a STREAMS module or driver. Rather, encryption technology 42 is a hardware-based or software-based encryptor that is accessed by a function that is registered at stream head 40. In the case of a software-based encryptor, the cryptographic code is included in the function registered at the stream head. In the case of a hardware-based encryptor, the function registered at the stream head is a function capable of communicating with an encryption driver, which in turn interfaces with the physical cryptographic hardware.

To provide a STREAMS-based protocol stack with a cryptographic function at the stream head, dynamic function registration is used to control execution of cryptographic algorithm implemented by encryption technology 42. Dynamic function registration altered the standard C library that defined stream heads by adding the following public data structure to the stream head library file <stream.h>:

```
struct sth_func_reg {
    int (*sth_copyin)( );          /* Write-side copyin */
    int sth_copyin_threshold;      /* argument passed to sth_copyin( ) */
    int (*sth_32_to_64)( ),        /* Write-side 32-to-64 conversion
                                      function */
    int (*sth_write_opt)( );       /* Write-side optional function */
    int (*sth_read_opt)( );        /* Read-side optional function */
```

-continued

```
    int (*sth_ioctl_opt)( );       /* Ioctl optional function */
    int (*sth_64_to_32)( );        /* Read-side 64-to-32 conversion
                                      function */
```

For reasons discussed below, the present invention modifies the public data structure above by adding the following:

```
    int (*str_copyout)( );         /* Read-side copyout */
```

The following private data structure was added to the stream head declaration itself to allow access to the public structure:

```
    struct sth_s  {
        . . .
        struct sth_func_reg sth_f_reg;
        int32 sth_in_progress;
        . . .
            }
```

In a STREAMS-based protocol stack of the prior art, the stream head is a very simple structure that provided an interface between kernel space and user space. Dynamic function registration altered the stream head to allow it to store pointers to a variety of functions, and execute these functions upon data processed by the stream head. The sth_f_reg structure defined above provides a place where pointers to functions are stored. If the stream head's sth_f_reg structure contains a pointer to a function, then that function is executed when data is processed by the stream head.

With the exception of the copyin and copyout functions, all of the function entries defined in the sth_f_reg structure perform optional functions. In other words, a function is not executed if it's corresponding entry in sth_f_reg does not contain a function pointer. In contrast, copyin and copyout are substitute functions. If there is not an entry for copyin, then the default Unix copyin routine is invoked to copy data between user space and kernel space. Likewise, if there is not an entry for copyout, then the default Unix copyout routine is invoked to copy data between user space and kernel space.

The write side encryption is implemented by either the substitute function sth_copyin or the optional function sth_write_opt, depending on how encryption technology 42 is implemented. Likewise, read side decryption is implemented by either the substitute function sth_copyout or the optional function str_read_opt.

The substitute functions sth_copyin and sth_copyout are ideally suited for software-based cryptology, with encryption technology 42 implemented by incorporating the cryptographic algorithm into sth_copyin and sth_copyout. Using these functions, data is encrypted as it is copied from user space 32 to kernel space 34, and data is decrypted as it is copied from kernel space 34 to user space 32, thereby minimizing the number of times that the data must be touched. If checksumming functionality continues to be included within the sth_copyin function, then sth_copyin_threshold will continue to reflect the TCP MTU size, as disclosed in U.S. patent application Ser. No. 08/593,313.

The optional functions sth_read_opt and sth_write_opt can be used with either hardware-based or software-based cryptographic algorithms, and offer several advantages. First, sth_write_opt can be invoked upon encapsulated data. One way to form encapsulated data is to invoke the esballoc( ) system call. The esballoc( ) system call takes an arbitrary chunk of memory in kernel space and allocates an mblk header that points to this memory via the b_datap and b_rptr pointers, as is well known in the art of STREAMS programming. For example, if one wished to encrypt and transmit over a network data stored in a buffer cache, the esballoc( ) system call can be invoked upon the data in the cache. Since the memory that is encapsulated already exists in kernel space, a copyin function will not be required. Therefore, a combined copyin/encrypt cannot be performed upon the data, while sth_write_opt can encrypt the data already in kernel space.

The second advantage is that sth_write_opt and sth_read_opt are invoked when the entire mblk chain is available and the cryptographic algorithm can utilize the individual mblk types to dictate how the chain is to be encrypted. In contrast, sth_copyin does not have access to the whole mblk chain until all data has been copied into kernel space 34 and encrypted.

For example, consider an mblk chain comprising one M_PROTO message followed by one or more M_DATA messages, with the M_PROTO message including a data structure describing how the data will be encrypted. Such a data structure can include an encryption technique identifier, a public key, an identification server identifier, and other pieces of information that are used to control the encryption process. Using this method, the encryption technology may be varied on a per message basis, or at any given interval, thereby avoiding pattern.

If encryption technology 42 is implemented using a hardware-based encryptor, then drivers capable of driving the hardware-based encryptor are registered at stream head 40 as the sth_write_opt and sth_read_opt functions. As in the embodiment shown in FIG. 3, the hardware-based encryptor must be monitored to prevent a close race condition. However, in FIG. 3 the close race condition was detected by an "in-progress" counter that was altered and checked within encryption multiplexor 132. Therefore, the close( ) routine associated with encryption multiplexor 132 has access to the "in-progress" counter.

The situation is somewhat different in the embodiment shown in FIG. 4. Since stream head 40 is controlling the drivers that encrypt and decrypt data, the "sth_in_progress" counter is defined as part of the private data structure of stream head 40, and the stream cannot be closed while the "sth_in_progress" counter is nonzero. Accordingly, a STREAMS kernel interface is required to allow the close( ) functions of the various modules and drivers in the stack to access the "in-progress" counter, and to allow register functions to increment and decrement the counter. Variations of such an interface are found in various versions of Unix. An extensive transport independent STREAMS kernel interface has existed the Hewlett-Packard's version of Unix since release version 10.10, and will be formally released to developers in release version 10.30.

The close( ) routines of all modules and drivers adjacent to the level at which encryption is being performed must be altered to check the "in-progress" counter before allowing the respective module or driver to close. The close( ) routines can be altered by altering the code of the modules, as is known in the art, or by defining alternate execution paths using the techniques disclosed in U.S. patent application Ser. No. 08/545,561, filed Oct. 19, 1995 and entitled "Dynamic Function Replacement For STREAMS Framework," which was previously incorporated by reference.

The following code snippet shows how the close( ) routine can be altered to support a hardware-based encryptor. The close( ) routine must be modified to include the below code as follows:

```
do    {
        spinlock(sth->sth_in_progress_flag_lock);
        if(sth->sth_in_progress) {
        /* There is an outstanding encryption in progress */
        get_sleep_lock((int) &sth->sth_in_progress_sleep_addr);
spinunlock(sth->sth_in_progress_flag_lock);
        error = sleep(&sth->sth_in_progress_sleep_addr);
        if(error)
                error = EINTR;
        }
} while (error == 0);
```

This above loop would cause the close( ) routine to sleep without causing a system panic or deadlock. The thread cannot exit until the current thread, which is used to service the encryption hardware, did the following:

```
spinlock(sth->sth_in_progress_flag_lock);
sth->sth_in_progress++;
spinunlock(sth->sth_in_progress_flag_lock);
/* Perform the work */
/* Reset the flag and wake up any sleeping threads */
spinlock(sth->sth_in_progress_flag_lock);
sth->sth_in_progress- -;
spinunlock(sth->sth_in_progress_flag_lock);
wake up(&sth->sth_in_progress_sleep_addr);
```

When sth_write_opt and sth_read_opt are registered in register 50 of stream head 40, controller 52 executes sth_write_opt to encrypt outbound data, and sth_read_opt to decrypt inbound data. When encryption technology 42 is implemented as a hardware-based encryptor, and user application is writing data via socket 38, sth_write_opt first accesses a spinlock to increment the "in-progress" counter. As discussed above, this flag must by set using a STREAMS kernel interface and close( ) operations must sleep on this flag if it is nonzero.

The hardware synchronization queue of the hardware-based encryptor must then be acquired by sth_write_opt. Unlike encryption multiplexor 132 in FIG. 3, which cannot wait for the synchronization queue and must service other requests, sth_write_opt may sleep until the hardware is available. When sth_write_opt acquires the synchronization queue, sth_write_opt passes the mblk data address to the hardware-based encryptor and invokes the hardware encryption routine. At some point thereafter, the hardware-based encryptor returns the encrypted data, sth_write_opt will decrement the "in-progress" counter, and the routine will complete. Then the STREAMS framework will pass the mblk data address to TCP layer 44 and processing will continue.

When encryption technology 42 is implemented as a hardware-based encryptor, and user application is reading data via socket 38, sth_read_opt first accesses a spinlock to increment the "in-progress" counter. The hardware synchronization queue of the hardware-based encryptor must then be acquired by sth_read_opt. When sth_read_opt acquires the synchronization queue, sth_read_opt passes the mblk data address to the hardware-based encryptor and invokes the hardware decryption routine. At some point thereafter, the hardware-based encryptor returns the decrypted data, sth_read_opt will decrement the "in-progress" counter, and the routine will complete. Then the STREAMS framework will complete movement of data into user space 122, thereby completing the read operation requested by user application 126.

U.S. patent application Ser. No. 08/593,313 filed Jan. 31, 1996 and entitled "STREAMS Function Registering," which was previously incorporated by reference, disclosed that a module or driver can register a function at the stream head by executing a function called str_func_install, thereby transmitting the function pointer of the function identified by the module or driver to an entry in the sth_f_reg data structure. For example, in FIG. 4, TCP layer 44 can register an encryption function by calling str_func_install, which transmits a function pointer stored in the function pointers 54 table to the appropriate entry in the sth_f_reg data structure, which is represented by register 50 in stream head 52.

The present invention adds two STREAMS ioctl commands that allow user application 36 to configure encryption, and are also useful in other dynamic function registration applications. The ioctl command I_GET_FUNC_REG is transmitted by application 36 via stream head 40 to each driver and module in the protocol stack. Each driver and module in the stack returns a function registration list containing a character name and a unique identifier for each possible function, thereby notifying user application 36 of the existence of all functions that can be registered. Using this information, user application 36 can issue the second ioctl command, I_SET_FUNC_REG, which allows user application 36 to register a function in the same manner that a module or driver can register a function by executing the function str_func_install or sending a M_SETOPTS message, as disclosed in U.S. patent application Ser. No. 08/545,561.

In another configuration, a trusted thread is executed that uses the ioctl commands disclosed above. The trusted could automatically register the proper encryption functions based on the application or environment. This configuration is especially beneficial when used with applications that were not designed to support encryption. The trusted thread could also be configured to cooperate with an authentication server that provides encryption methods and keys based on the user login, application, destination IP address, or other characteristics. Such a thread could be configured to work with authentication servers that are known in the art, such as the Kerberos authentication system.

A more sophisticated method of registering functions involves modifying TCP layer 44 to screen messages and register functions and configure encryption based on the messages. TCP layer 44 can be modified in by altering the module code, as is known in the art, or by defining replacement functions in accordance with U.S. patent application Ser. No. 08/545,561.

For example, a replacement TCP module write put function can be defined that scans for M_PROTO messages, such as TPI T_CONN_REQ and T_BIND_REQ messages. For example, a TPI T_CONN_REQ message is used to establish a connection to a specific IP address. The replacement put function can be constructed to examine the IP address, and determine (by accessing an encryption server or by some other means) whether the IP address represents a trusted remote. If it does, no encryption is necessary. Alternatively, if the remote is not trusted, the replacement put routine can register the appropriate encryption functions.

In addition, the replacement put routine can supply the encryption key, or obtain it from another source, such a an encryption server.

The replacement put function can also be constructed to scan for TPI T_BIND_REQ messages. TPI T_BIND_REQ messages are used to bind an application to a specified protocol stack and port. In a manner similar to that described above, the replacement put function can determine what level of encryption is required, determine the encryption keys, and register the encryption function at the stream head. Such a replacement put function is especially advantageous when used in conjunction with applications that were not originally designed to employ encryption.

Although the discussion above is with respect to a TCP/IP stack, it should be noted that similar techniques can be used with other protocol stacks. In addition, it is possible to use simpler techniques with certain types of protocol stacks, such as UDP/IP stack. In most implementations, UDP is a connectionless datagram protocol. In FIG. 4, the TCP/IP protocol stack can be converted to a UDP/IP protocol stack by replacing TCP layer 44 with a UDP layer. A UDP message will consist of an M_PROTO message containing a T_UNITDATA_REQ message followed by zero or more M_DATA messages. Since T_UNITDATA_REQ message includes the IP address, the registered function can simply perform encryption as needed on a per message basis.

Figure 5:
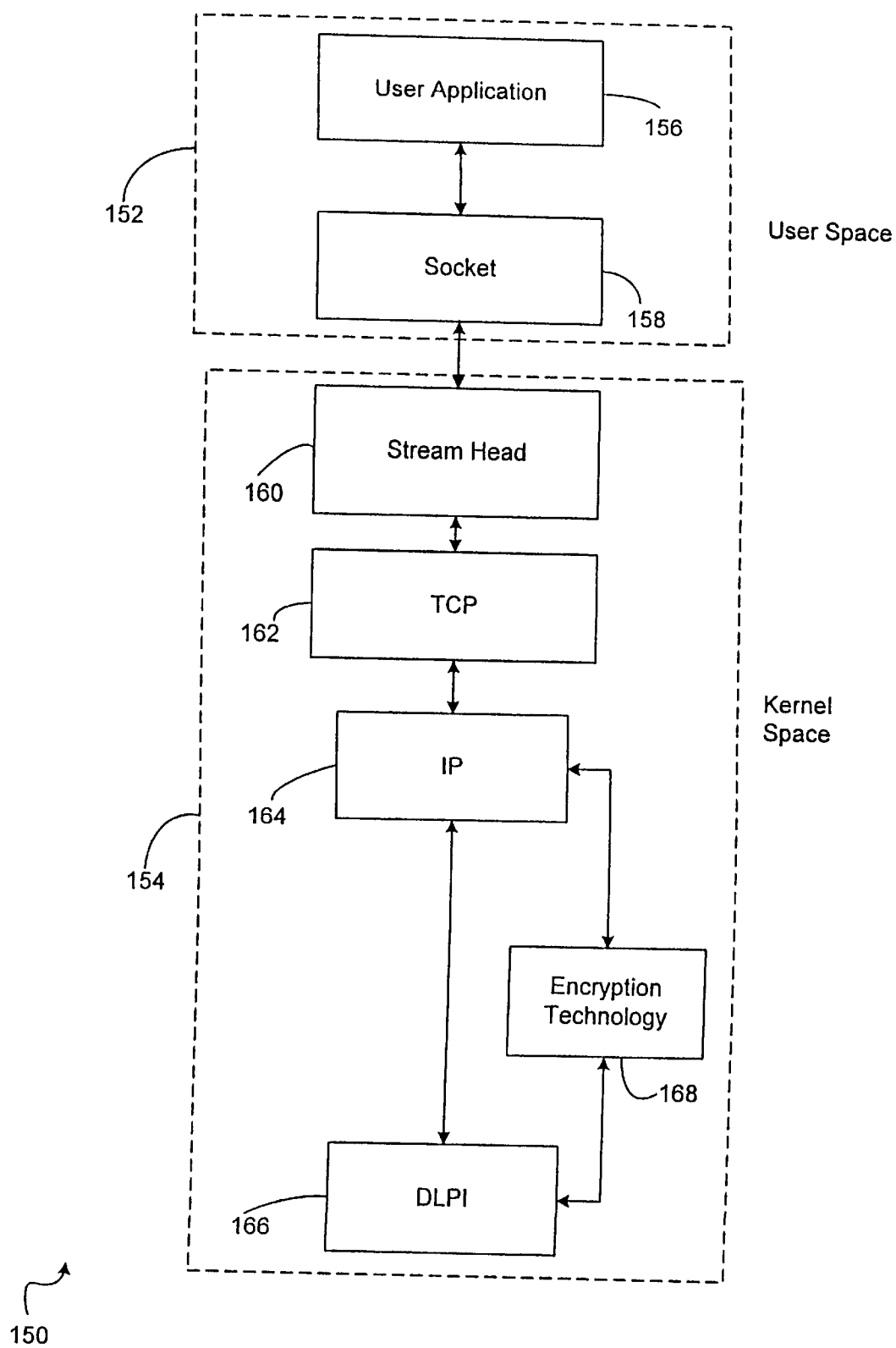
FIG. 5 is a diagram of a computer system showing yet an embodiment of the present invention wherein cryptographic technology is inserted between layers of a protocol stack.

FIG. 5 is a diagram showing a computer system 150 that encrypts and decrypts data in accordance with another embodiment of the invention. Computer system 150 includes user space 152 and kernel space 154. User space 152 includes user application 156 and socket 158, and kernel space 154 includes stream head 160, TCP layer 162, IP layer 164 DLPI layer 166, and encryption technology 168.

In FIG. 5, put routines of IP layer 164 and DLPI layer 166 have been modified to route data to and from encryption technology 168. However, encryption technology 168 may be positioned at other locations within the TCP/IP stack. The put routines may be modified using techniques known in the art, or alternatively, replacement put routines can be defined and inserted into the modules execution path using dynamic function replacement, as disclosed in U.S. patent application Ser. No. 08/545,561. If a software-based cryptographic algorithm is employed, the algorithm may be included directly in the replacement put routines.

Figure 6:
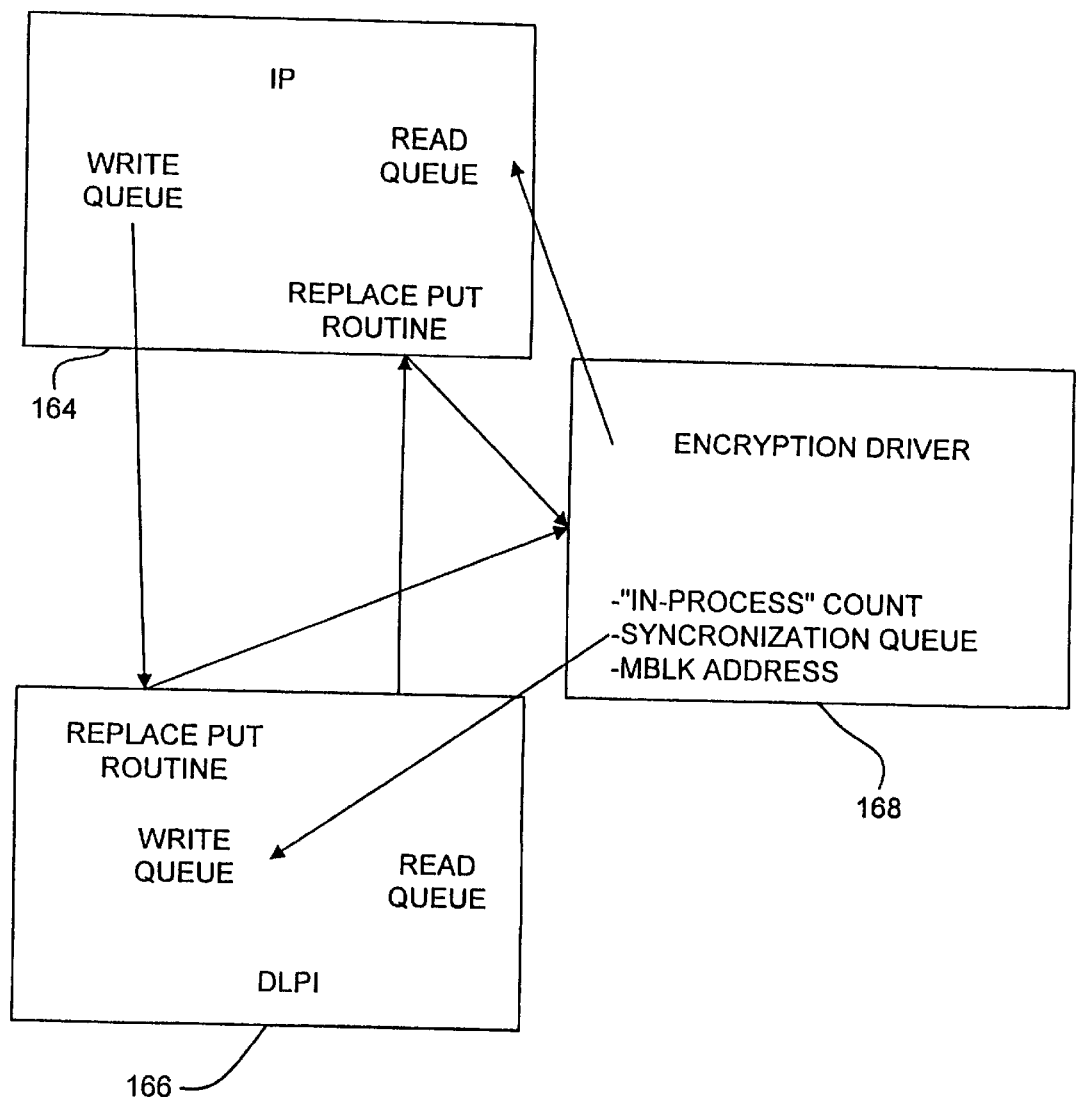
FIG. 6 is a detailed diagram of showing an encryption driver inserted between the IP and DLPI layers of the computer system shown in FIG. 5.

FIG. 6 is a detailed diagram of IP layer 164, DLPI layer 166, and encryption driver 168. FIG. 6 shows an embodiment configured to encrypt data using a hardware-based encryptor. In FIG. 6, the write side put routine of DLPI layer 166 has been replaced with a replacement put routine that routes outbound data to encryption driver 168. After the data has been encrypted, it is placed in the write queue of DLPI layer 166 by encryption driver 168. The read side put routine of IP layer 164 has also been replaced with a replacement function that routes inbound data to encryption driver 168. After the data has been decrypted it is placed in the read queue of IP layer 164.

The problems associated with adding hardware-based encryption to a protocol stack are similar to those discussed with respect to the embodiments described above. Accordingly, encryption driver 168 includes an "in-progress" counter, a synchronization queue, and registers that store mblk addresses of memory blocks that are being processed.

To use dynamic function replacement to add encryption to computer system 150, replacement put and close routines for IP layer 164 and DLPI layer 166 must be defined. Dynamic function replacement uses standard Unix System V Release

4.2 (SVR4.2) Device Driver Reference STREAMS data structures.

The data structures that are modified to implement dynamic function replacement are the streamtab and qinit structures. Each module or driver defines a streamtab structure that contains pointers to qinit structures.

The qinit structures are for read, write, read multiplexor, and write multiplexor queues that are created by the STREAMS framework. The qinit structures contain function address for the open, close, put, service, and administrative functions which are invoked by the STREAMS framework on behalf of the queue's owner, i.e. the module or driver.

The functions defined within the qinit structure are actually written by the module or driver developer and are automatically executed by the framework based on the current application execution path, such as a message flowing up or down a stream. Because the STREAMS framework knows the locations of all of these data structures and may access them independently of the application or the module or driver, dynamic function replacement remaps these structure addresses to alternative streamtabs and qinit structures that define the new function addresses.

The following basic STREAMS framework data structures are of most interest:

```
/* Streams queue initialization structure */
struct qinit    {
    int    (*qi_putp)( );    /* Queue put procedure */
    int    (*qi_srvp)( );    /* Queue service procedure */
    int    (*qi_open)( );    /* Queue open procedure */
    int    (*qi_qclose)( );  /* Queue close procedure */
    int    (*qi_qadmin)( );  /* Queue administrative procedure */
    struct module_info * qi_info;
    struct module_stat * qi_mstat;
    };
/* Streams driver and module declaration structure */
struct streamtab    {
    struct qinit * st_rdinit;    /* defines read QUEUE */
    struct qinit * st_wrinit;    /*defines write QUEUE */
    struct qinit * st_muxrinit;  /* for multiplexing drivers only */
    struct qinit * st_muxwinit;  /* ditto */
    };
```

These basic fields within these data structures are standardized via the SVR4.2 Device Driver Reference commonly referred to as the DDI (Device Driver Interface, discussed above).

Consider an IP module having the following standard and replacement structures:

```
/* standard read side qinit structure */
struct qinit IP_rinit = {
    IP_rput, IP_rsrv, IP_open, IP_close, NULL, &IP_minfo, NULL}
/* standard write side qinit structure */
struct qinit IP_winit = {
    IP_wput, IP_wsrv, IP_open, IP_close, NULL, &IP_minfo,
    NULL}
/* replacement read side qinit structure */
struct qinit IP_rinit_encrypt = {
    IP_wput_encrypt, IP_rsrv_encrypt, IP_open, IP_close_encrypt,
    NULL, &IP_minfo,
    NULL}
/* replacement write side qinit structure */
struct qinit IP_winit_encrypt = {
    IP_wput_encrypt, IP_wsrv_encrypt, IP_open, IP_close_encrypt,
    NULL, &IP_minfo,
    NULL}
/* standard streamtab */
struct streamtab IP                = {&IP_rinit, &IP_winit};
/* replacement (encryption) streamtab */
struct streamtab IP_encrypt        = {&IP_rinit_encrypt,
                                      &IP_rinit_encrypt};
```

Dynamic function replacement defines a str_alt_install( ) routine that configures alternative streamtabs for STREAMS modules and drivers. The alternative steamtabs can be dynamically swapped into and out of the execution path of a stream using a STREAMS ioctl call. The str_alt_install( ) routine is invoked by the following call:

```
str_alt_install (name, flags, n, streamtabs)
where
char          *name;         /* name of module or driver */
unsigned int  flags;         /* STR_IS_MODULE/DEVICE */
int           n;             /* number of alterative streamtabs */
struct streamtab *streamtabs[ ];  /* array of pointers to streamtabs */
```

The STREAMS ioctl commands available to user application 156 are I_ALTSTRTAB_ACTIVE and I_ALTSTRTAB_FUTURE. I_ALTSTRTAB_ACTIVE selects the active streamtab of a module instance, while I_ALTSTRTAB_FUTURE selects the active streamtab for a module type, when future instances of that module type are opened.

In addition to the replacement functions defined for IP layer 164. Replacement functions must also be defined for DLPI layer 166 in a similar manner. Once the replacement functions are defined, user application 156 can enable encryption by activating the "encryption" streamtabs, and can turn off encryption by activating the "default" streamtabs. In another configuration, a cryptographic module can be pushed on a STREAMS-based protocol stack, with the cryptographic module have a normal function that acts as a data "passthrough" and is active when cryptography is not required and a cryptographic replacement function that is used when cryptography is desired.

Prior art cryptography packages, such as the Secured Socket Library (SSL) specification v. 3.0, serve several purposes. Such packages determine the encryption technique to be employed, determine the public and private keys to be used, and route data to and from the encryption technology. The present invention retains these features, and provides several new benefits. For example, a single common interface is used for both network communications and cryptographic technology, thereby simplifying user applications. The cryptographic package is no longer responsible for coordinating the movement of data to and from the cryptographic technology. This is now handled by the STREAMS framework.

In addition, the present invention provides improved performance and throughput. Data need only cross a protection domain between user space and kernel space once, thereby reducing the number of context switches required.

The present invention also reduces system resource utilization compared to prior cryptographic packages. SSL requires multiple sockets, buffers, file table entries, etc. In contrast, all that is required to implement the present invention are the additional resources required to route data to and from the cryptographic technology, because the existing protocol stack is also used to support encryption.

The present invention also provides cryptology at a more basic, system-wide level. Using the present invention, a computer system can be configured to implement a uniform system-wide cryptographic strategy. For example, all data going through a TCP/IP stack can encrypted, independent of any user applications that may use the TCP/IP stack. This also provides better security, since control of encryption can be taken away from a multitude of application developers and given to a single system developer. Also, since encryption and decryption occur in kernel space, it is more secure and less likely to be attacked by user applications. Finally, since Unix-standard STREAMS interfaces are used, cryptographic packages can continue to evolve and be updated, while maintaining seamless integration and interaction with user applications.

Although the present invention has been described with reference to preferred embodiments, workers skilled in the art will recognize that changes may be made in form and detail without departing from the spirit and scope of the invention.

What is claimed is:

1. An apparatus implemented in a computer system that transmits a data stream between a device and a user process, the apparatus comprising:
a device driver coupled to the device, for communicating the data stream to the device;
a stream head coupled between the device driver and the user process for communicating the data stream between the user process and the device driver, wherein the stream head includes a function controller, and
an encryptor for performing a cryptographic function upon the data transmitted in the data stream, wherein the encryptor is controlled by the function controller of the stream head.

2. The apparatus of claim 1 wherein the encryptor comprises a cryptographic function that is identified by a function pointer, the stream head includes an active function register adapted to receive the function pointer that identifies the cryptographic function, and the function controller controls execution of the cryptographic function identified by the function pointer stored in the active function register.

3. The apparatus of claim 1 wherein the user process exists in user space, the device driver exists in kernel space, the encryptor comprises a combined encryption/copyin function, and the function controller controls encryption of the data stream by executing the combined encryption/copyin function as data is copied between the user space and the kernel space.

4. The apparatus of claim 1 wherein the device driver exists in kernel space, the data stream includes data blocks that exist in the kernel space, and the encryptor performs the cryptographic function upon the data blocks that exist in the kernel space.

5. The apparatus of claim 2 wherein the device driver includes an available function register that stores the function pointer that identifies the cryptographic function.

6. The apparatus of claim 2 wherein the stream head is adapted to receive a command from the user process that identifies the function pointer and causes the function pointer to be stored in the active function register of the stream head.

7. The apparatus of claim 2 wherein the computer system is adapted to execute a thread that identifies available cryptographic functions to the user process.

8. The apparatus of claim 4 wherein the data blocks that exist in the kernel space are identified by an M_PROTO message and at least one M_DATA message.

9. The apparatus of claim 5 wherein the device driver initiates transmission of the function pointer stored in the available function register to the active function register of the stream head.

10. The apparatus of claim 5 wherein the device driver is adapted to receive a command from the user process to identify to the user process the function pointer stored in the available function register of the device driver.

11. The apparatus of claim 7 wherein the user process is adapted to identify to the thread a selected cryptographic function from the available cryptographic functions, and the thread is adapted to store a function pointer that identifies the selected cryptographic function the active function register of the stream head.

12. The apparatus of claim 8 wherein the M_PROTO message identifies an cryptographic algorithm to be used by the encryptor when encrypting data contained in the data blocks.

13. The apparatus of claim 8 wherein the M_PROTO message identifies an cryptographic key to be used by the encryptor when perform the cryptographic function upon data contained in the data blocks.

14. The apparatus of claim 8 wherein the M_PROTO message identifies an authentication server, wherein the authentication server identifies an cryptographic key to be used by the encryptor when performing the cryptographic function upon data contained in the data blocks.

15. An apparatus implemented in a computer system that transmits a data stream between a device and a user process, the apparatus comprising:
a device driver coupled to the device, for communicating the data stream to the device,
a stream head coupled between the device driver and the user process for communicating the data stream between the user process and the device driver;
a module interposed between the device driver and the stream head, wherein the module transmits the data stream between the device driver and the stream head and performs a function upon the data stream;
an encryptor that comprises a software function; and
a controller for generating a control command that remaps addresses of the function and the encryptor to dynamically insert and remove the encryptor from the data stream, thereby allowing the data stream to be selectively encrypted or not encrypted as the data stream flows between the device and the user process.

16. An apparatus implemented in a computer system that transmits a data stream between a device and a user process, the apparatus comprising:
a device driver coupled to the device, for communicating the data stream to the device;
a stream head coupled between the device driver and the user process for communicating the data stream between the user process and the device driver;
a module interposed between the device driver and the stream head, wherein the module transmits the data stream between the device driver and the stream head and performs a function upon the data stream;
an encryptor that comprises a hardware-based cryptographic device;
an encryption driver coupled to the hardware-based cryptographic device, for controlling the hardware cryptographic device to perform the cryptographic function upon the data stream; and
a controller for generating a control command that remaps addresses of the function and the encryption driver to dynamically insert and remove the encryption driver from the data stream, thereby allowing the data stream to be selectively encrypted or not encrypted as the data stream flows between the device and the user process.

17. The apparatus of claim 16 wherein the data stream is subdivided into a plurality of memory blocks, a reference count is initialized to a starting value, the reference count is incremented when a first memory block of the plurality of memory blocks is routed to the encryption driver, the reference count is decremented when a second memory block of the plurality of memory blocks is routed from the encryption driver, and the module cannot be closed unless the reference count is equal to the starting value.

18. A method of performing a cryptographic function upon a data stream as the data stream flows between a user process and an I/O device, wherein the data stream has an unencrypted portion and an encrypted portion, and the I/O device is coupled to a device driver that exists in kernel space and the user process is coupled to a stream head that provides an interface between the kernel space and user space, the method comprising:

communicating the unencrypted portion of the data stream between the user space and the kernel space;

performing the cryptographic function to move data between the unencrypted portion of the data stream and the encrypted portion of the data stream, wherein the cryptographic function is registered at the stream head;

communicating the encrypted portion of the data stream to the device driver; and communicating the encrypted portion of the data stream between the device driver to the device.

19. The method of claim 18 wherein performing the cryptographic function to move data between the unencrypted portion of the data stream and the encrypted portion of the data stream comprises:

identifying an active cryptographic function based on a function pointer stored in an active function register of the stream head; and performing the active cryptographic function to move data between the unencrypted portion of the data stream and the encrypted portion of the data stream.

20. The method of claim 18 wherein communicating the unencrypted portion of the data stream from the user space to the kernel space at the stream head and performing the cryptographic function to move data between the unencrypted portion of the data stream and the encrypted portion of the data stream together comprise:

executing a combined encryption/copyin function comprising:

reading the unencrypted portion of the data stream from user space;

encrypting the unencrypted portion of the data stream into the encrypted portion of the data stream; and storing the unencrypted portion of the data stream into kernel space.

21. The method of claim 18 wherein the unencrypted portion of the data stream includes unencrypted data blocks that exist in kernel space, the unencrypted data blocks are identified by an M_PROTO message and at least one M_DATA message, and performing the cryptographic function to move data between the unencrypted portion of the data stream and the encrypted portion of the data stream comprises:

encrypting the unencrypted data blocks to form encrypted data blocks, wherein the encrypted data blocks are part of the encrypted portion of the data stream.

22. The method of claim 19 and further comprising:

identifying an available cryptographic function based on a function pointer stored in an available function register of the device driver; and transmitting the function pointer stored in the available function register of the device driver to the active function register of the stream head, thereby making the available cryptographic function the active cryptographic function.

23. The method of claim 19 and further comprising:

transmitting from the user process to the active function register of the stream head a function pointer that identifies an available cryptographic function, thereby making the available cryptographic function the active cryptographic function.

24. The method of claim 19 and further comprising:

executing a thread that identifies available cryptographic functions to the user process;

selecting a selected cryptographic function from the available cryptographic functions; and transmitting from the thread to the active function register of the stream head a function pointer that identifies the selected cryptographic function, thereby making the selected cryptographic function the active cryptographic function.

25. The method of claim 21 and further comprising:

identifying an encryption algorithm to be used to encrypt the unencrypted data blocks based on the M_PROTO message.

26. The method of claim 21 and further comprising:

identifying a cryptographic key to be used to encrypt the unencrypted data blocks based on the M_PROTO message.

27. The method of claim 21 and further comprising:

identifying an authentication server based on the M_PROTO message that, in turn, identifies a cryptographic key to be used to encrypt unencrypted data blocks.

28. A method of adding a cryptographic function to a protocol stack within a computer system, the method comprising:

identifying the cryptographic function; and registering the cryptographic function at the stream head, thereby causing the cryptographic function to encrypt data flowing through the protocol stack in a first direction and decrypt data flowing through the stack in a second direction as the data is processed by the stream head.

29. A data structure implemented in a computer system that provides a data path between a user process, a module, and a device driver, the device driver being resident in a system kernel and controlling a device to transfer data between the kernel and the device, where data written by the user process travels downstream toward the driver, and data received by the driver from the device travels upstream to be retrieved by a user process, the data structure comprising:

a normal function;

an cryptographic function; and a controller for generating a control command that remaps addresses of the normal function and the cryptographic function to dynamically insert and remove the cryptographic function from the data path, thereby allowing the data path to be selectively encrypted or not encrypted as the data path flows between the device and the user process.

30. The data structure of claim 29 wherein the normal function is a pass-through function.

31. A program storage medium having computer readable program code thereon for causing a data stream to be encrypted and decrypted as the data stream flows between a device and a user process, the program storage medium comprising:

a first segment of computer readable program code for causing a device driver that is coupled to the device to communicate the data stream to the device;

a second segment of computer readable program code for causing a stream head coupled between the device driver and the user process to communicate the data stream between the user process and the device driver; and a third segment of computer readable program code for causing an cryptographic function to encrypt data flowing through the data stream in a first direction, and decrypt data flowing through the data stream in a second direction, wherein the cryptographic function is registered at the stream head.

32. A program storage medium readable by a computer, tangibly embodying a program of instructions executable by the computer to perform a cryptographic function upon a data stream having an unencrypted portion and an encrypted portion, wherein the data stream flows between a user process and an I/O device, with the I/O device being coupled to a device driver that exists in kernel space and the user process being coupled to a stream head that provides an interface between the kernel space and user space, the method comprising:

communicating the unencrypted portion of the data stream from the user space to the kernel space;

performing the cryptographic function to move data between the unencrypted portion of the data stream and the encrypted portion of the data stream, wherein the cryptographic function is registered at the stream head;

communicating the encrypted portion of the data stream to the device driver; and communicating the encrypted portion of the data stream from the device driver to the device.

* * * * *